May 7, 1935.  H. C. WASSON  2,000,542
FLUID PRESSURE CONTROL APPARATUS
Filed May 19, 1931
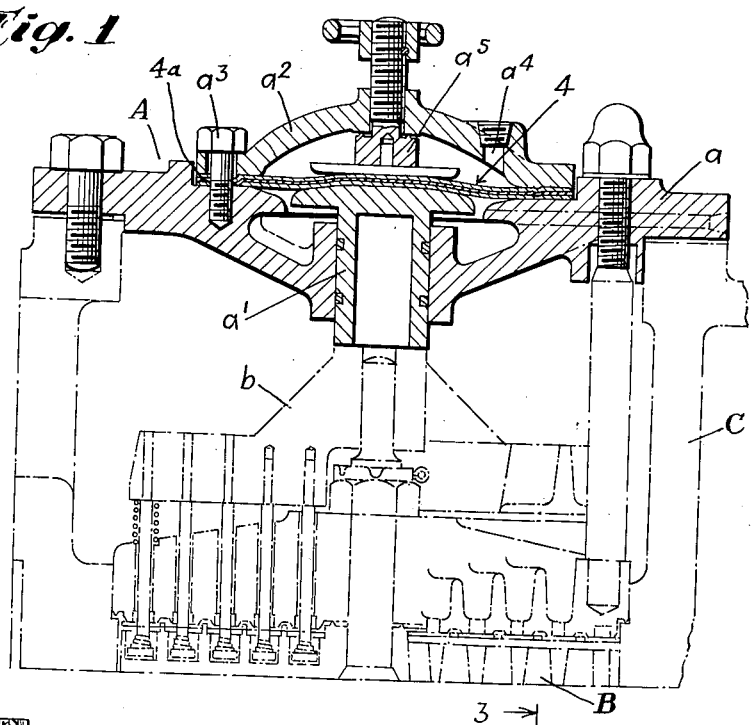
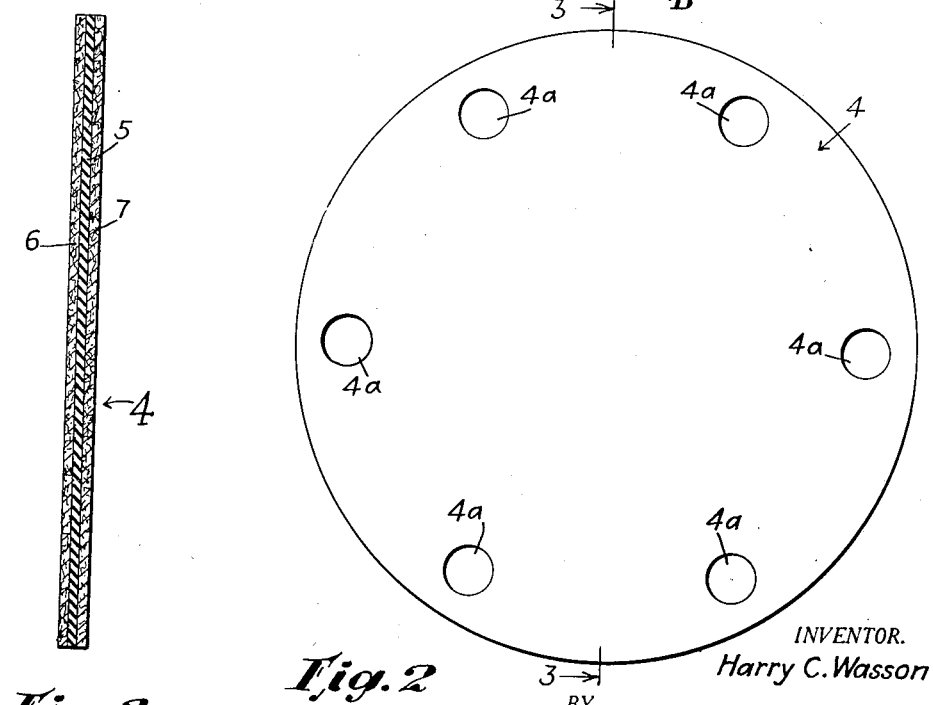
INVENTOR.
Harry C. Wasson
BY
Ira L. Nickerson
ATTORNEY.

Patented May 7, 1935

2,000,542

UNITED STATES PATENT OFFICE 2,000,542

FLUID PRESSURE CONTROL APPARATUS

Harry C. Wasson, Franklin, Pa., assignor to Chicago Pneumatic Tool Company, New York, N. Y., a corporation of New Jersey Application May 19, 1931, Serial No. 538,447

1 Claim. (Cl. 137—157)

This invention relates to fluid pressure control apparatus and more particularly to flexible elements in direct contact with the fluid pressure medium.

One object of the invention is to provide an improved form of fluid tight partition or diaphragm for use between a fluid under pressure and a movable object to which force is to be applied to produce movement. Other objects will be apparent from the detailed description which follows.

Exhaustive tests of all the different diaphragm materials show that no one material gives satisfactory service over an extended period when subjected to such frequent operation as may develop under certain conditions as in the unloading valve of a compressor or pump, whether of the stationary or portable type. A leather diaphragm soon loses its flexibility becoming stiff and brittle, so that it leaks fluid after a comparatively small number of operations. A rubber diaphragm is soon decomposed by the chemical action of oil or the like in the pressure fluid and is unable to support the applied pressure. No artificial fibrous material is available which possesses the desired qualities of flexibility, strength, and fluid tightness.

It has been discovered that certain materials may be used in combination, however, to produce a diaphragm having satisfactory operating characteristics and a greatly extended life. Rubber may be used to secure fluid tightness and leather to give strength and to protect the rubber from heat, friction, and decomposition. By preference a layer of rubber or rubber compound is used between layers of leather to make a composite diaphragm. The layer of rubber or rubber compound may be strengthened, as by fibrous material therein, and may consist of cloth or fabric impregnated with rubber. In making up the laminated or composite diaphragm it is preferable to assemble the layers in loose engagement and not to cement or otherwise secure them to one another since they have different coefficients of expansion and undue strains result from such a practice.

In order to illustrate the invention one concrete embodiment thereof is shown in the accompanying drawing, in which:

Fig. 1 illustrates a diaphragm in use in the unloading valve assembly of a compressor, the valve and portions of the compressor wall being indicated in broken outline;

Fig. 2 is a plan view on an enlarged scale of the diaphragm; and

Fig. 3 a sectional view substantially on the line 3—3 of Fig. 2.

Fig. 1 illustrates diaphragm 4 of the present invention embodied in an unloading unit A for use with a valve assembly B conventionally mounted within the walls of a compressor C. Body $a$ of the unloading unit serves as a cover plate for the opening in the outer wall of compressor C and supports a movable member $a'$ in line with the axis of valve assembly B to actuate valve lifter $b$ to hold the valves of the unit in open position when the compressor is to be unloaded. Diaphragm 4 is securely clamped between body $a$ and cap plate $a^2$ as the cap screws $a^3$ extending through openings 4$a$ in the diaphragm and extends across the top of member $a'$. Pressure fluid is admitted within cap member $a^2$ over diaphragm 4 through an opening $a^4$ and the force exerted by the pressure fluid is transmitted by diaphragm 4 to member $a'$. Unit A may have a hand actuated screw plunger $a^5$ to force member $a'$ to unloading position when pressure fluid is not available. Inasmuch as the apparatus disclosed in Fig. 1 merely illustrates one use of the invention, further description thereof is omitted.

The improved diaphragm shown in Fig. 1 is illustrated on an enlarged scale in Figs. 2 and 3 and consists of superposed sheets of different material with the bolt holes 4$a$ therethrough in register. By preference the central layer 5 is of suitable material to insure against leakage or seepage of the pressure fluid through the diaphragm. The additional layer or layers are to add strength to the diaphragm and to protect the fluid tight layer from damage through heat, friction, or substances entrained by the pressure fluid which would cause decomposition by chemical action. The central layer 5 may be composed of rubber or a rubber compound. For added strength it may contain fibrous material or may take the form of a cloth or fabric sheet impregnated with rubber or rubber compound. The enclosing sheets 6 and 7 may be of leather or similar fibrous material having sufficient toughness to resist wear, sufficient absorption to take up oil entrained with the pressure fluid and sufficient flexibility to permit proper operation of the composite diaphragm. The sheets forming the diaphragm are loosely assembled and not secured to one another so that the different coefficients of expansion will not result in undesirable strains on individual layers or sheets.

The life of the rubber is prolonged by the action of the retaining layers of leather. When, in course of time, the rubber begins to disintegrate under the action of the oil, it forms a gummy substance which plugs the pores in the adjacent leather thus still maintaining fluid tightness.

While the invention has been herein shown and described in what is now considered to be a preferred form, it is to be understood that the invention is not limited to the specific details thereof but covers all changes, modifications, and adaptations within the scope of the appended claim.

I claim as my invention:

A fluid actuated device comprising an enclosure, a substantially flat diaphragm dividing said enclosure into two chambers, means for admitting pressure fluid to one of said chambers, and a plunger actuated by said diaphragm, said diaphragm comprising an inner layer of rubber and outer sheets or layers of leather, said layers being in contact with each other and secured to each other only at the peripheral edges thereof, the central portion of the diaphragm being imperforate and in loose engagement with a stop member in the fluid chamber and a plunger in the other chamber, the stop members being movable manually with respect to the enclosure to actuate the diaphragm and plunger.

HARRY C. WASSON.

CERTIFICATE OF CORRECTION.

Patent No. 2,000,542.                                                  May 7, 1935.

HARRY C. WASSON.

It is hereby certified that error appears in the printed specification of the above numbered patent requiring correction as follows: Page 1, second column, line 14, for "the" read by; and page 2, second column, line 11, the claim, for "members" read member; and that the said Letters Patent should be read with these corrections therein that the same may conform to the record of the case in the Patent Office.

Signed and sealed this 9th day of July, A. D. 1935.

(Seal)                                                                Bryan M. Battey
Acting Commissioner of Patents.